(12) United States Patent
Kamminga

(10) Patent No.: US 6,361,060 B1
(45) Date of Patent: Mar. 26, 2002

(54) PERSONAL WATERCRAFT CARRIER

(76) Inventor: Bruce L. Kamminga, 8695 Hannah Lake, SE., Caledonia, MI (US) 49316

( * ) Notice: Subject to any disclaimer, the term of this patent is extended or adjusted under 35 U.S.C. 154(b) by 0 days.

(21) Appl. No.: 09/520,945

(22) Filed: Mar. 8, 2000

Related U.S. Application Data

(60) Provisional application No. 60/123,490, filed on Mar. 9, 1999.

(51) Int. Cl.$^7$ .................................................. B60P 3/10
(52) U.S. Cl. .................................................. 280/414.1
(58) Field of Search ........................... 280/414.1, 414.2, 280/414.3; 301/64.1, 64.7, 65

(56) References Cited

U.S. PATENT DOCUMENTS

| | | |
|---|---|---|
| 3,333,861 A | 8/1967 | Hoffman |
| 3,742,534 A | 7/1973 | Guest |
| 3,744,072 A | 7/1973 | Pannell et al. |
| 3,843,202 A * | 10/1974 | Lacerte ...................... 301/64.7 |
| 3,955,830 A * | 5/1976 | Hardwick ................ 280/414.3 |
| 4,217,944 A * | 8/1980 | Pascal ......................... 152/323 |
| 4,858,943 A * | 8/1989 | Cote ........................ 280/414.1 |
| 5,005,846 A * | 4/1991 | Taylor .......................... 280/30 |
| 5,016,893 A | 5/1991 | Hart, Jr. |
| 5,104,198 A * | 4/1992 | Prout et al. ................. 301/64.2 |
| 5,114,165 A * | 5/1992 | Vogel ..................... 280/47.331 |
| 5,176,394 A * | 1/1993 | Veazey .................... 280/414.2 |
| 5,203,815 A * | 4/1993 | Miller ..................... 280/47.26 |
| 5,275,473 A * | 1/1994 | Hicks ........................ 301/64.7 |
| 5,396,857 A * | 3/1995 | Emery, Jr. .................. 114/270 |
| 5,417,447 A * | 5/1995 | Godbersen ............... 280/414.1 |
| 5,431,423 A | 7/1995 | Moreland, Sr. |
| 5,494,338 A * | 2/1996 | Hardesty et al. ........... 301/64.7 |
| 5,518,261 A * | 5/1996 | Godbersen ............... 280/414.1 |
| 5,722,809 A * | 3/1998 | Urbank ..................... 280/414.1 |
| 5,961,139 A * | 10/1999 | Nichols, II ............... 280/414.1 |
| 6,032,964 A * | 3/2000 | Capobianco ........... 280/47.331 |

* cited by examiner

Primary Examiner—Kevin Hurley
(74) Attorney, Agent, or Firm—McGarry Bair LLP

(57) ABSTRACT

The invention relates to a personal watercraft carrier for transporting personal watercraft such as jet skis, wave runners and the like, into and out of the water. The personal watercraft carrier has a conventional carrier frame, which includes rail supports for the watercraft, and a tongue having a handle for pushing or pulling the carrier, and is supported by one or more axles, which rotatably mount large-surface wheels. The wheels support the weight of the watercraft and carrier while traveling over soft terrain e.g. sand. The wheels are constructed so that the carrier as a whole has neutral or negative-buoyancy. As a result of the neutral or negative-buoyancy of the carrier, the carrier can drop away as the depth of the water increases, thus enabling the watercraft to be easily removed from the carrier. Similarly, the carrier can be positioned below the surface of the water for retrieval of the watercraft. The watercraft can then be easily floated into position over the carrier for retrieval.

In one embodiment, the wheels are open so that water freely flows into the wheels. The large-surface wheels are typically constructed of a heavy-duty, dense plastic or metal and have a cylindrical rim and a disk or a number of spokes extending perpendicularly inward from the rim with gussets to the cylindrical surface.

The carrier also includes rails that can be extended with a tongue-and-groove construction to accommodate longer watercraft, or multiple watercraft, on one carrier.

14 Claims, 8 Drawing Sheets

US 6,361,060 B1

PERSONAL WATERCRAFT CARRIER

CROSS-REFERENCE TO RELATED APPLICATIONS

This application claims the benefit of U.S. Provisional application Ser. No. 60/123,490 filed Mar. 9, 1999.

BACKGROUND OF THE INVENTION

1. Field of the Invention

The invention relates to a personal watercraft carrier. In one of its aspects, the invention relates to a personal watercraft carrier with large-surface wheels which has neutral or negative buoyancy. In another of its aspects, the invention relates to a personal watercraft carrier having an expandable capacity to support large or multiple watercraft.

2. Description of the Related Art

Personal watercraft carriers have been used for transporting a personal watercraft such as jet skis, wave runners and the like, over sand and for transferring the watercraft from the carrier into and out of a body of water. Some of the known carriers have rollers, soft balloon tires or skids that support the weight of the watercraft and carrier during travel over soft terrain. These carriers are generally buoyant and float when in the water. The buoyancy makes it difficult to position the carrier under the watercraft when it is desirable to remove the watercraft from the water and may also make it somewhat difficult to remove the watercraft from the carrier when the carrier and watercraft are placed in the water.

Some carriers are constructed to carry only one personal watercraft at a time. This requires additional time and effort to transfer multiple watercraft into and out of a body of water.

SUMMARY OF THE INVENTION

According to the invention, a personal watercraft carrier has a carrier frame, the carrier frame having rail supports for watercraft, a tongue for pushing or pulling the carrier, and one or more axles mounting wheels for rolling movement of the carrier frame over a surface. The wheels have an relatively wide outer surface so that the carrier with a watercraft mounted thereon is easily rolled over soft surfaces, such as sand, for depositing the watercraft in the water. The wheels are constructed so that the carrier as a whole has neutral or negative buoyancy, whereby when the carrier with watercraft is rolled into the water for launching the watercraft, the carrier drops away from the watercraft as the depth of the water increases. The carrier can further be rolled into the water to be positioned under the watercraft for removing the watercraft from the water. Preferably, the wheels of the carrier are constructed of a heavy-duty plastic or a metal, and the outer surface is formed by a cylindrical rim having a high width to diameter ratio. The wheels further include a hub and a plurality of spokes, or a central disk, extending radially inwardly from the cylindrical rim to the hub or center of the wheel. The wheels are open so that water freely flows into them.

The personal watercraft carrier according to the invention further includes a carrier frame having rail supports for watercraft, wherein the rail supports are extendible by the user for carrying a longer watercraft, or multiple watercraft, on the carrier. The rail supports comprise an extendible rail system including segmented pieces removably connectable in series, the segmented pieces including a foot for removably mounting to the carrier frame, an upwardly projecting portion fixed to the foot, and a top portion extending from an upper edge of the upwardly projecting portion within 45 degrees of a generally horizontal orientation. The segmented pieces include a leading edge and a trailing edge, the leading edge of each segmented piece adapted to be received in alignment with the trailing edge of a preceding segment piece. One of the leading edge and the trailing edge includes a tongue and the other of the leading edge and the trailing edge includes a groove for receiving the tongue.

The personal watercraft carrier according to the invention further includes a motorized pull-assist mechanism comprising a longitudinal frame, a cross member, and a rotative force generator, the cross member mounting the force generator and including an axle for rotatively mounting wheels for movement of the pull-assist mechanism, and a linkage for transferring force from the generator to the wheels

BRIEF DESCRIPTION OF THE DRAWINGS

The invention will now be described with reference to the drawings wherein.

DETAILED DESCRIPTION OF THE PREFERRED EMBODIMENTS

Figure 1:
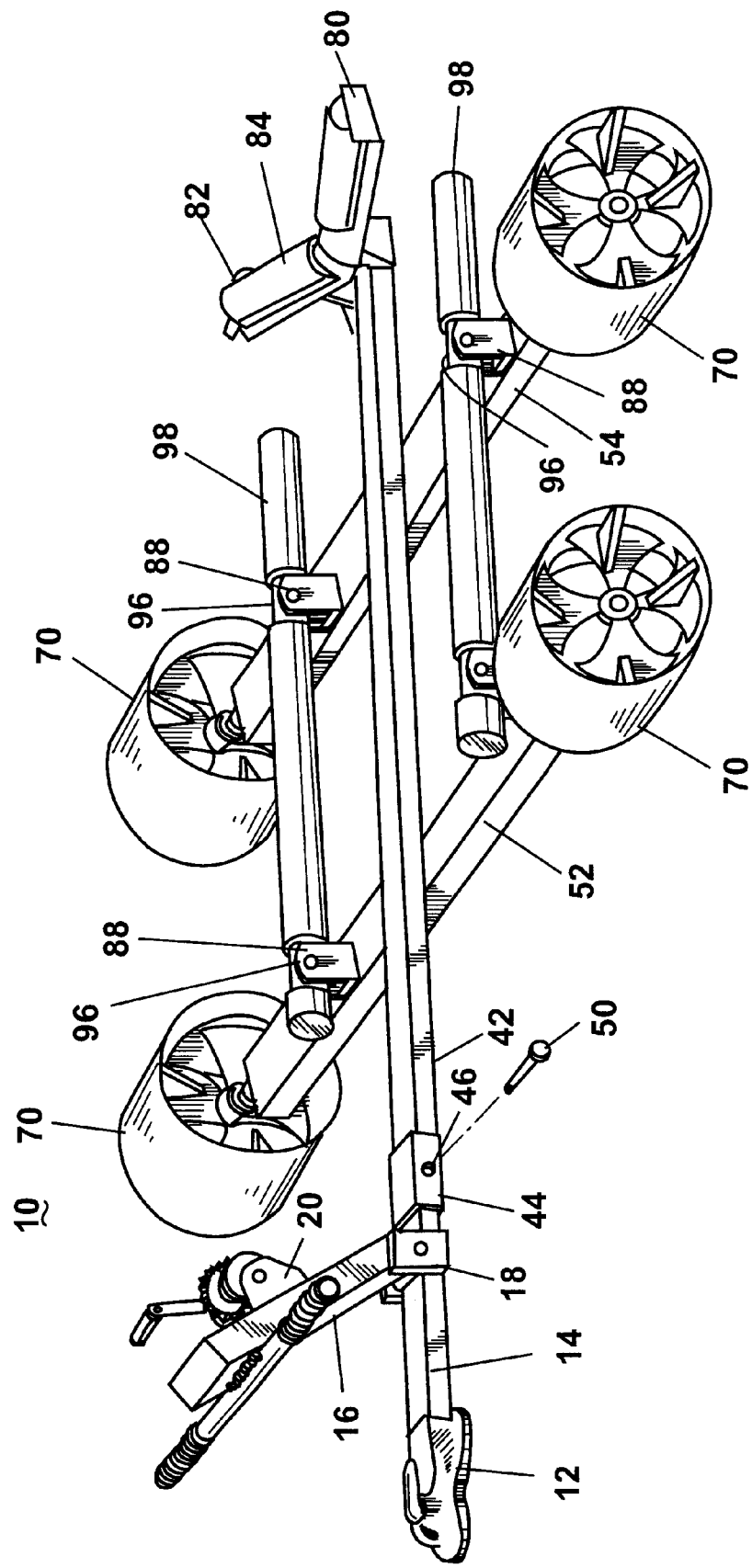
FIG. 1 is a perspective view of a personal watercraft carrier according to the invention.

Referring now to the drawings and to FIGS. 1–5 and 12 in particular, a first embodiment of a personal watercraft carrier 10 with multiple wheels 70, having overall neutral or negative-buoyancy, is shown. Because the welds and common fasteners for assembling the component parts are well known, the attachment methods used are not described in detail for the sake of brevity.

The personal watercraft carrier 10 includes a trailer hitch 12 for connection to a towing vehicle (not shown). The trailer hitch 12 is attached to a tongue 14 that extends rearwardly from the trailer hitch 12, and is constructed of galvanized steel or aluminum tube. The tongue 14 can be removed for manipulation of the carrier 10 by hand or be interchanged with another tongue having a different hitch connection. A winch support 16, constructed of galvanized steel or aluminum tube, is affixed to the tongue 14 with winch support brackets 18. The winch support brackets 18 are constructed of galvanized steel or aluminum plates and are welded to the lower end of the winch support 16 to hold the winch support 16 at an angle to the tongue 14 and to provide a connection for bolting the winch support 16 to the tongue 14.

Figure 2:
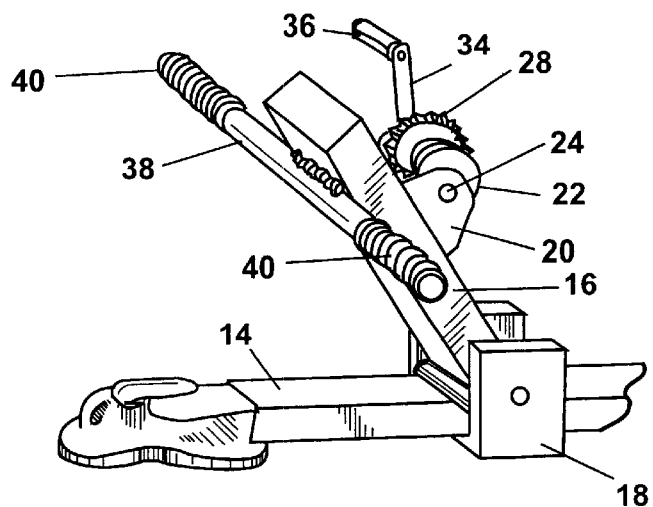
FIG. 2 is an enlarged partial perspective view of a winch support assembly of the personal watercraft carrier of FIG. 1.

Referring to FIG. 2, a U-shaped winch bracket 20, of galvanized steel or aluminum construction, is secured to the winch support 16. A spool 22 is rotationally held in the winch bracket 20 and carried on a spool axle 24, which perpendicularly pierces both legs of the U-shaped winch bracket 20. A cable (not shown) is connected at one end to the spool 22 in a winding relationship and at a second end to a personal watercraft 26 for securing the personal watercraft 26 to the carrier 10 during unloading and retrieval. A ratchet gear 28 is coaxially fixed to an end of the spool 22, and cooperates with a ratchet dog (not shown), to control the rotation of the spool in a conventional fashion when the cable is used to retrieve the watercraft.

To aid in winding the cable onto the spool 22, a substantially L-shaped crank 34 is coaxially affixed to the spool 22 with the ratchet gear 28. The end of the short leg of the crank is affixed perpendicular to the end-face of the spool at its axial center, and extends outwardly, thus orienting the long leg of the crank 34 perpendicularly to the axis of the spool 22 and ratchet gear 28, and at a slightly divergent angle with the face of the spool 22, to provide clearance when the crank 34 is turned. A knob 36 is rotatably attached to the free end of the crank and faces outward. Any number of commercially available winch assemblies could be substituted for apparatus previously described.

Also included on the winch support 16 is a pull handle 38 constructed of tubular galvanized steel or aluminum that is welded or bolted in place, having ends symmetrically overhanging and perpendicular to the winch support 16. The handle 38 can be round, square or rectangular in cross section. The pull handle 38 is further supplied with a pair of grips 40, secured to each end of the pull handle 38.

Referring again to FIG. 1, the carrier 10 further comprises a central support 42, constructed of galvanized steel or aluminum tube, which extends the length of the carrier 10. At the forward end of the central support 42 there is a tongue receiver 44, a piece of galvanized steel or aluminum tube of the same shape but slightly larger than the tongue 14, which is welded or U-bolted in place. Arranged on and piercing the tongue receiver 44 are holes 46 aligning with holes (not shown) through the rear end of the tongue 14, enabling a locking interchangeable attachment of the tongue 14 to the center support 42 using locking pin(s) or bolt(s) 50.

Figure 4:
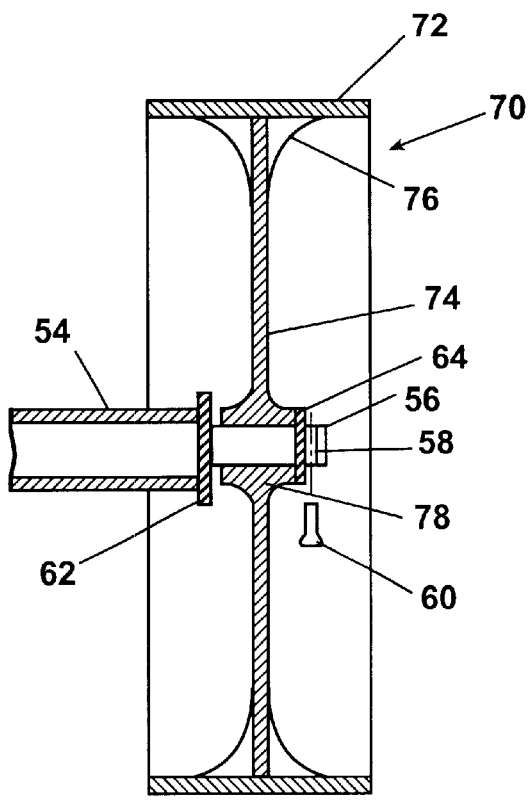
FIG. 4 is a cross-sectional view of the wheel of FIG. 3 mounted on an axle.

A forward crossbeam 52 is located perpendicular to and is fixed beneath the central support 42, slightly aft of the tongue receiver 44. Rearward and parallel to the forward crossbeam 52 is a rear cross beam 54, which is also perpendicularly fixed beneath the central support 42. As depicted in FIGS. 1 and 4, an axle 56, having a circular cross section and being constructed of galvanized or stainless steel or aluminum, collinearly extends from each end of each of the beams 52, 54, centrally located and axially aligned on the ends of the beams 52, 54. Each axle 56 includes an aperture 58 passing therethrough perpendicular to the axis of the axle 56, sized to receive a locking pin 60 to secure a wheel 70 at the end of the axle. Also located on each axle 56 is a collar or stop 62 to restrict the side-to-side motion of the wheel 70 on the axle 56 and keep the wheel 70 spaced from the end of the beam 52, 54. A washer 64 can be used to prevent binding between the locking pin 60 and the wheel 70.

Figure 3:
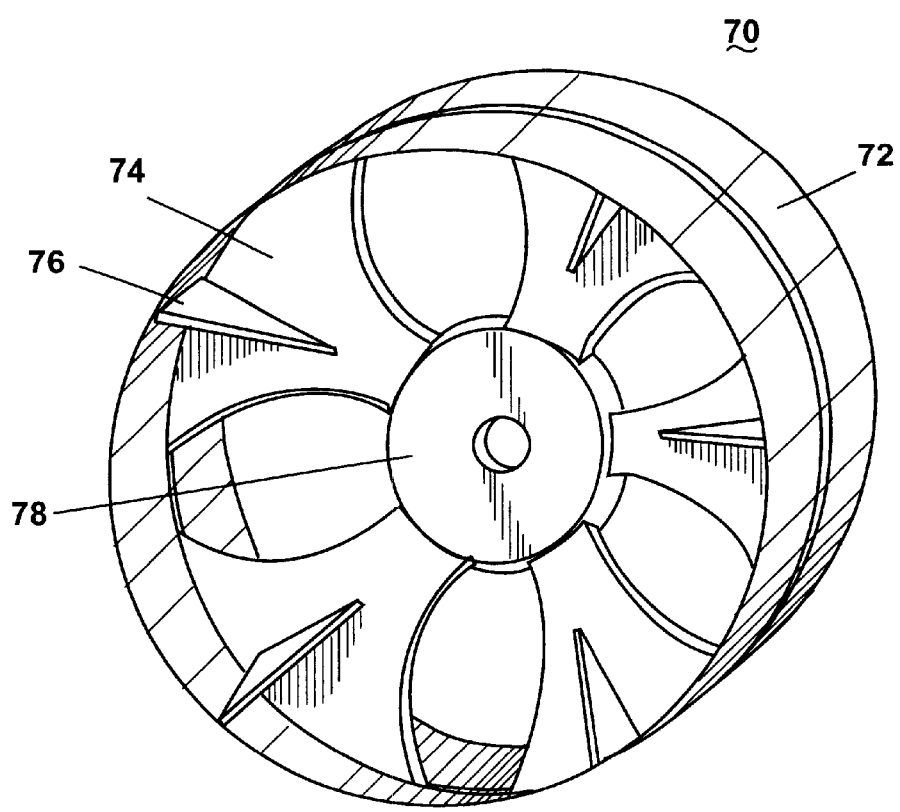
FIG. 3 is a perspective view of a wheel for the personal watercraft carrier of FIG. 1.

An embodiment of an open-sided, large-surface wheel 70, constructed of a dense, heavy-duty plastic, or a metal, is shown in FIGS. 1, 3, and 4. Each wheel 70 has a cylindrical rim 72 with a wide rolling surface, a central hub 78 and a number of spokes 74 extending radially inwardly from the cylindrical rim 72 to the hub 78. Gussets 76 are affixed between the spokes 74 and the cylindrical rim 72 to strengthen the connection between the spokes and the rim 72. The gussets 76 help to reduce the overall weight by reinforcing critical points. The cylindrical rim 72 has a width, perpendicular to the spokes 74, related to the diameter of the wheel 70 by a ratio preferably greater than or equal to 0.6. The spokes 74 terminate at a central hub 78 concentric with the cylindrical rim 72. With the wheel 70 rotatably mounted on the axle 56, the axle 56 fits into and extends beyond the face of the central hub 78, exposing the aperture 58 for receiving the locking pin 60.

Referring again to FIGS. 1 and 12, the carrier 10 further includes right-hand and left-hand auxiliary roller brackets 80, 82, each bracket comprising a weldment of galvanized steel or aluminum plates. The brackets 80, 82 are affixed to either side of the rearmost end of the central support 42 of the carrier 10, projected perpendicularly outwardly from the center support 42 and angled above the horizontal. An auxiliary roller axle (not shown) is mounted within each bracket 80, 82, in alignment therewith transverse to the center support 42 and elevated above the horizontal. An auxiliary roller 84 is rotatably mounted on each auxiliary roller axle, the auxiliary rollers 84 forming a shallow upturned "V" to aid in aligning the watercraft 26 with the carrier 10 during loading and unloading.

Figure 5:
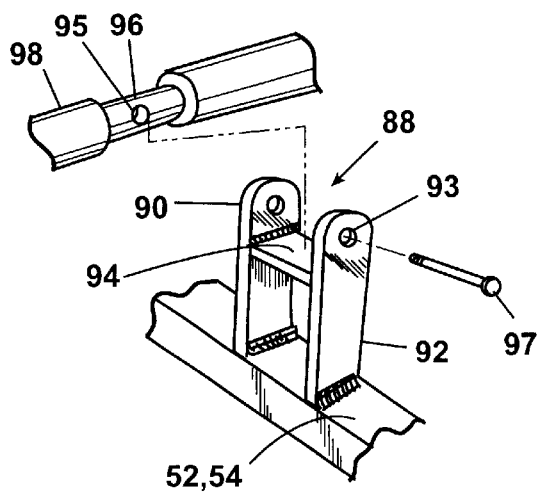
FIG. 5 is an enlarged partial perspective view of a rail support bracket assembly of the personal watercraft carrier of FIG. 1.
Figure 12:
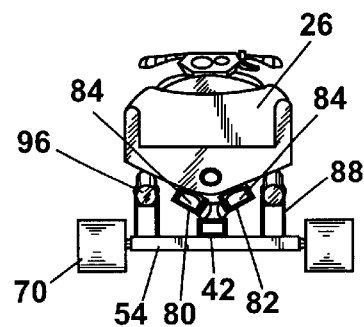
FIG. 12 is a rear view of a personal watercraft carrier having a personal watercraft carried thereon.

Rail support brackets 88, shown in detail in FIG. 5, are welded or bolted to the forward and rear cross beams 52, 54. Two brackets 88 on each cross beam 52, 54 are mounted equidistant from and symmetrical about the center support 42, and in front-to-rear alignment with the corresponding bracket 88 on the other of the crossbeams 52, 54. Furthermore, the brackets 88 are spaced apart at a distance that is slightly less than the width of the underside of the watercraft 26, as shown in FIG. 12, and are adjustable to fit different size personal watercraft. Each bracket 88 comprises a right-side bracket plate 90 and a left-side bracket plate 92, each constructed of galvanized steel or aluminum, rounded at an upper end, and having an aperture 93 therethrough in alignment with a corresponding aperture in the opposing plate 90, 92 and an aperture 95 in a watercraft support rail 96. A pair of brackets 88 hold rail 96 at a height sufficient to maintain the watercraft 26 clear of the carrier central support 42 and cross beams 52, 54 as shown in FIG. 12. The plates 90, 92 are attached perpendicularly upright on cross beam 52, 54 in a parallel relationship to one another, and are connected by a horizontal bracket cross member 94 that spaces the plates 90, 92 to fittingly receive the rail 96. The rail 96 is secured in the bracket 88 by a pin 97 inserted through apertures 93, 95.

Watercraft support rails 96 for holding the watercraft on the carrier 10, constructed of tubular galvanized steel or aluminum, are shown in FIGS. 1, 5 and 12. The rails 96 are affixed to the rail support brackets 88 and are disposed from front to back parallel to the central support 42. The ends of the rails 96 can be bent downwardly at a slight angle to ease loading of the watercraft. Rails 96 can also be covered with foam cushioning 98 made from wear-resistant neoprene or similar materials.

Figure 6:
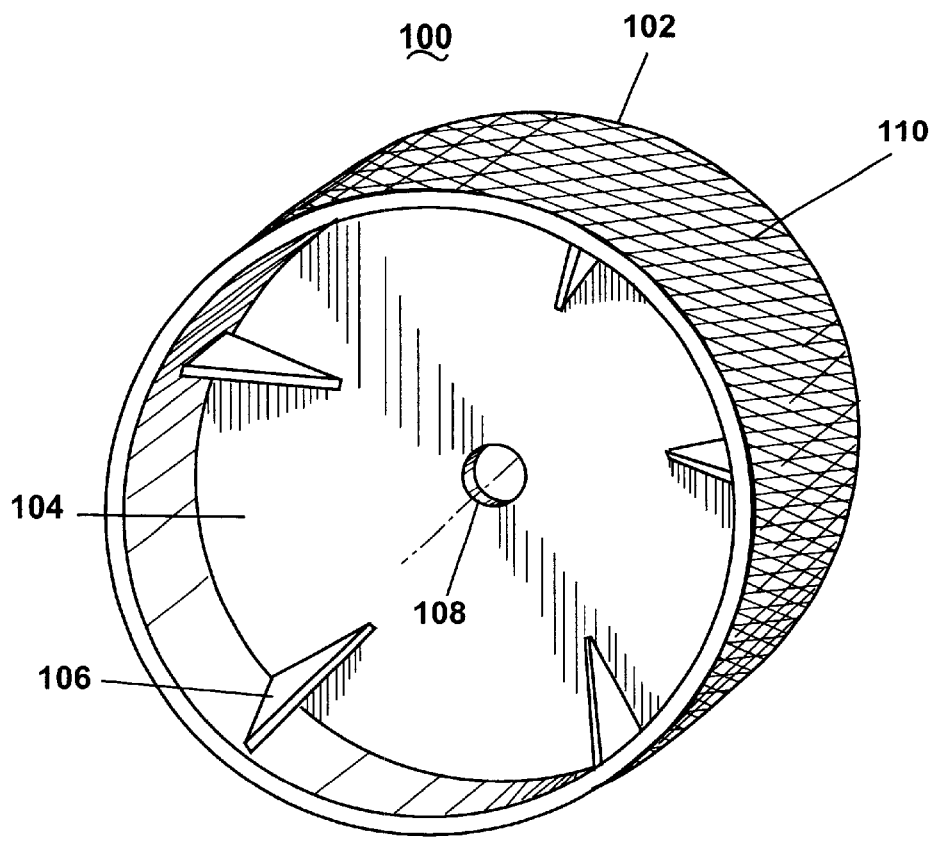
FIG. 6 is a perspective view of a second embodiment of a wheel for a personal watercraft carrier according to the invention.
Figure 7:
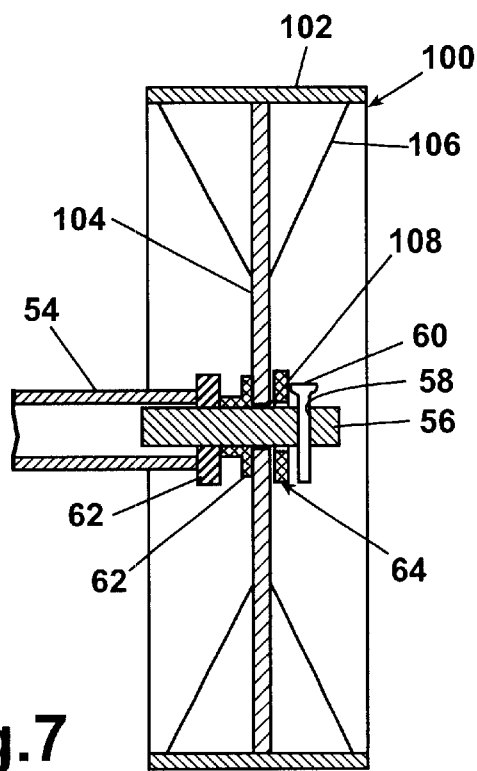
FIG. 7 is a cross-sectional view of the wheel of FIG. 6 mounted on an axle.

The invention further comprises a wheel 100, depicted in FIGS. 6 and 7, suitable for use instead of the wheel 70 in the carrier 10. The wheel 100 comprises a circular disk 104 with a central aperture 108, a cylindrical rim 102, and gussets 106. The disk 104 is mounted to the surface 102, perpendicular to the surface 102 and generally centered in the width of the surface 102. The gussets 106 are perpendicularly affixed to the disk 104 and surface 102 to provide reinforcement therebetween. The wheel 100 is generally constructed of aluminum or plastic. The surface 102 is preferably embossed with a pattern 110 to enhance gripping and rolling on a soft or slippery surface. The surface 102 has a width, perpendicular to the disk 104, related to the diameter of the wheel 100 by a ratio preferably greater than or equal to 0.6. The central aperture 108 is for receiving the axle 56. An additional collar 62 is shown in FIG. 7 for spacing the wheel 100 from the end of the crossbeam 54.

Figure 8:
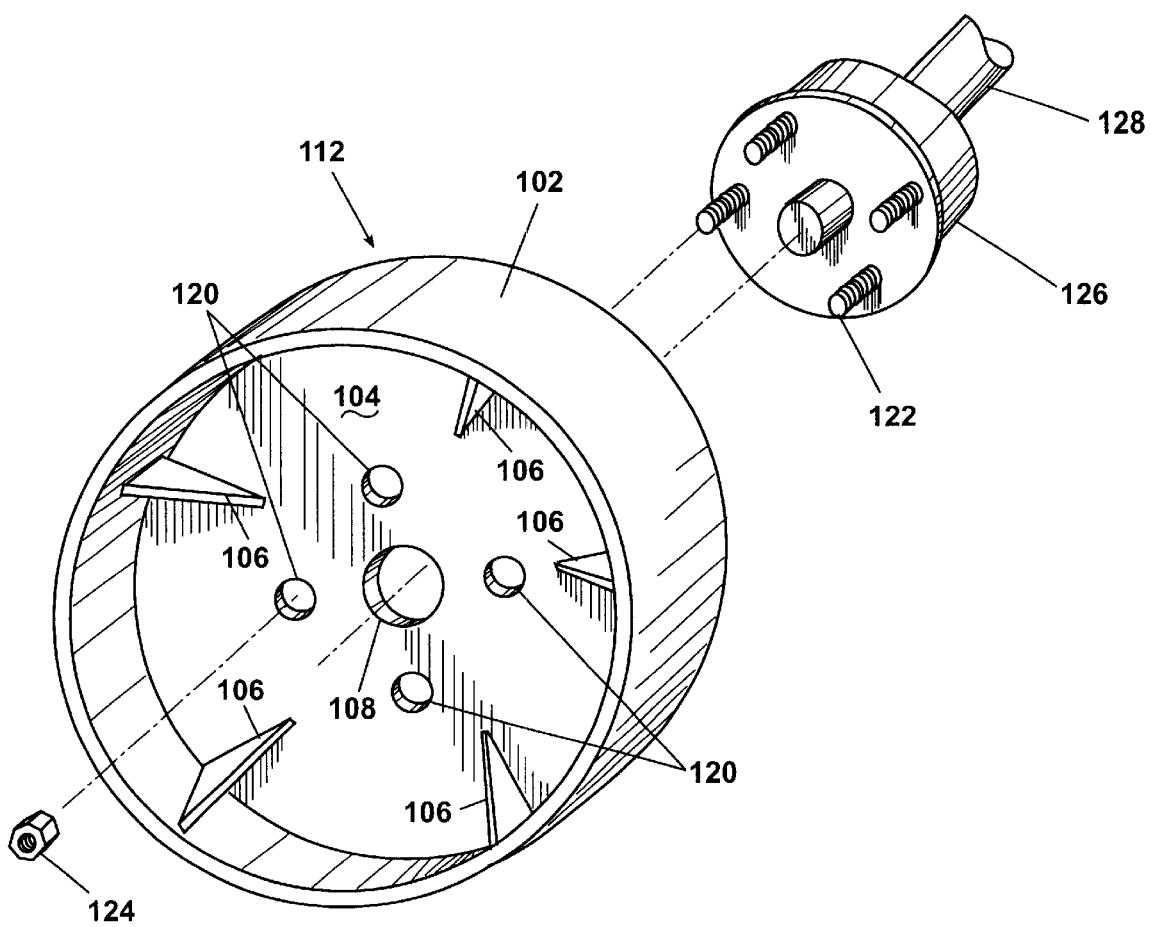
FIG. 8 is an exploded perspective view of a third embodiment of a wheel for a personal watercraft carrier according to the invention and a commercial axle assembly for mounting the wheel.

Another embodiment of a wheel 112 for the carrier 10 is shown in FIG. 8, in which like numerals are used to describe like parts. In this embodiment, in addition to the central aperture 108, a plurality of apertures 120 are spaced about the central aperture 108 in the disk 104 for mounting the wheel 112 on lugs 122 attached to a standard trailer-wheel hub 126 on an axle 128. The wheel 112 is retained on the wheel hub 126 by appropriate lug nuts 124 or other commercially available fasteners.

Figure 9:
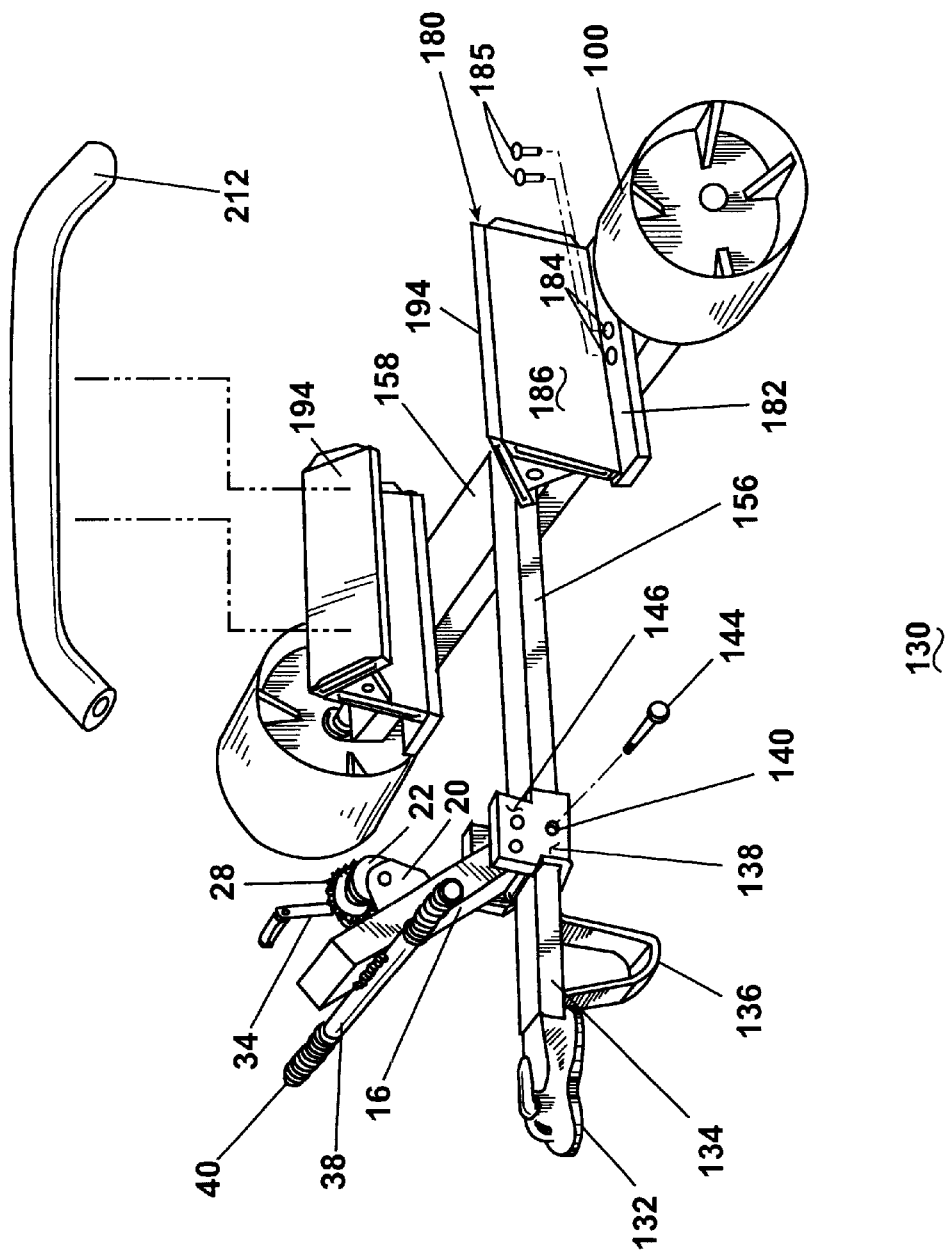
FIG. 9 is a perspective view of a further embodiment of a personal watercraft carrier according to the present invention.
Figure 10:
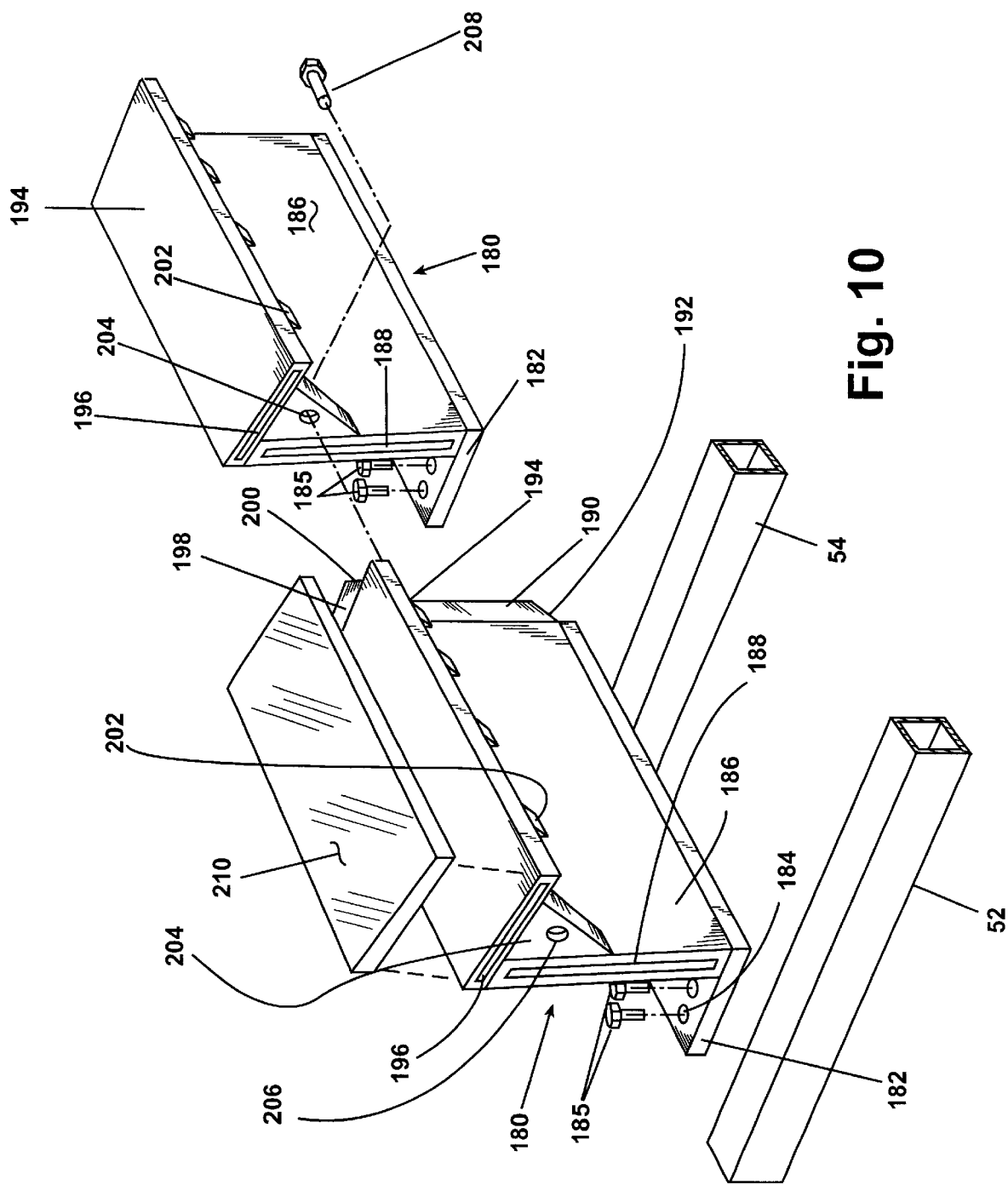
FIG. 10 is an exploded partial perspective view of an expandable rail assembly of the personal watercraft carrier of FIG. 9.

Referring now to FIGS. 9 and 10, a second embodiment of a personal watercraft carrier 130 having overall neutral or negative-buoyancy utilizing a single pair of wheels 100 is shown. The personal watercraft carrier 130 comprises a trailer hitch 132 for connection to a towing vehicle (not shown). Attached to and extending rearwardly from the hitch 132, tongue 134 is constructed of galvanized steel or aluminum tube. A tongue support 136, to support the carrier 130 at rest, extends downwardly from the tongue 134. The tongue support 136 is shorter than the radius of the wheel 100. The tongue 134 is fitted into a tongue receiver 138, which is made of galvanized steel or aluminum tube of the same shape and slightly larger than the tongue 134, and welded to the forward end of the central support beam 156. Holes 140 through the tongue receiver 138 align with holes (not shown) through the rear end of the tongue 134 to receive a locking pin or bolt 144 to connect the tongue 134 to the carrier 130. The tongue 134 can be removed for manipulation of the carrier 130 by hand or can be interchanged with another tongue having a different hitch connection or length.

Winch support brackets 146, constructed of galvanized steel or aluminum plates are welded to the tongue receiver 138. Winch support 16, constructed of galvanized steel or aluminum tube, is connected at its lower end to the winch support brackets 146 at an upright angle to the tongue 134. The support 148 provides location and attachment for the winch mechanism as described in the previous embodiment and illustrated in FIG. 2.

The central support beam 156, of a proportional length to give optimum leverage and balance for maneuvering the carrier 130, is provided. The tongue receiver 138 is welded to the forward end of the central support beam 156. A cross member 158 is affixed to the aft end of the support beam 156 and perpendicular to the longitudinal axis thereof. The cross member 158 is constructed of U-shaped galvanized steel or aluminum channel having a width greater than its height. The channel is directed downwardly. The cross member 158 is somewhat longer than a watercraft is wide. Disposed on the cross member 158 in a symmetrical pattern on either side of the central support beam 156 are holes (not shown) that receive bolts 185 for attaching rails 180. A single pair of wheels 100 are shown rotatably mounted to the ends of the cross member 158 in the manner previously disclosed, but any of the disclosed wheels 70, 100, 112 are suitable for this application.

The rails 180 are expandable and modular for the support of different watercraft. FIG. 9 discloses the use of the rails 180 on the carrier 130 having a single cross member 156. FIG. 10 is an enlarged view showing the details of construction of the rails 180 in the context of installation on the carrier 10 of FIG. 1, but these details are likewise applicable to installation on the carrier 130 of FIG. 9. The rails 180 can be extended with tongue-and-groove construction to accommodate a longer watercraft, or two or more watercraft, on the carrier 10, 130.

The modular rails 180 comprise a horizontal foot 182 of generally rectangular shape with perpendicular edges, having holes 184, located to register with corresponding holes in the cross member 158, or cross beams 52, 54, and attached thereto by bolts 185. Attached to the foot 182 is a side wall 186 that has the same length as the horizontal foot 182 and is welded in position perpendicularly upward on the top surface and aligned with the center-facing long edge of the horizontal foot 182. An upper support plate 194 is mounted to the upper end of the sidewall 186 and extends downwardly at an acute angle thereto. However, it is within the scope of the invention for the upper support plate 194 to be perpendicular to the sidewall 186. The forward-facing edge of the sidewall 186 includes a central groove 188, best shown in FIG. 10. A tab 190 projects from the trailing edge of the side wall 186, and is formed to receivably fit into the groove 188 on an adjacent modular rail 180 to maintain a parallel alignment between the adjoining rails 180. The groove 188 has a depth slightly greater that the extended projection of the mating tab 190. The tab 190 can be formed from the material of the sidewall 186 or can be a separate piece affixed into a groove at the appropriate edge of the sidewall. The tab 190 is also shown to have chamfers 192 cut into the ends to assist in assembly and alignment.

The upper support plate 194 has the same length as the horizontal foot 182 and the side wall 186 and is welded along one edge to a chamfered top edge of the side wall 186, with the opposing edge of the upper support plate 194 extending perpendicularly inwardly to the center of the carrier 10, 130. A forward-facing edge of the upper support plate 194 comprises a centered groove 196. Like the groove 188 on the sidewall 186, the groove 196 in the upper support plate 194 is of a depth slightly greater than the extended projection of a mating tab 198. Again, as with the side wall 186, the mating tab 198 is located on the opposite edge of the upper support plate 194 from the groove 196, and formed to receivably fit into a like groove 196 on another modular rail 180 to maintain a parallel alignment between the adjoining rails 180. The tab 198 can be formed from the material of the upper support plate 194 or can be a separate piece fitting into a groove at the appropriate edge of the upper support plate 194. The tab 198 is also shown to have chamfers 200 cut into the ends to assist in assembly and alignment.

To strengthen the rail assemblies and help support the watercraft, a series of rail gussets 202 are located between the underside of the upper support plate 194 and the center-facing surface of the sidewall 186, perpendicular to both surfaces. As a further distinction, there are outer rail gussets 204, which are positioned flush with the forward and rearward edges of the modular rails. Each outer rail gusset 204 includes an extension hole 206, located to align with extension holes 206 on any other modular rail 180, which receives a bolt 208 or similar fastener for affixing two or more modular rails 180 together.

A piece of foam cushioning 210 made from wear-resistant neoprene or similar materials is affixed to the upper support plate 194 with an adhesive or with small fasteners that are mounted sub-flush to the surface of the foam cushioning 210. A pair of rails 212, similar in construction to the rails 96 of FIG. 1, can be affixed to the upper support plate 194 instead of the foam cushion 210.

Any features in the foregoing embodiments can be selectively incorporated into other embodiments. For example, personal watercraft carrier 10 can accommodate modular rail 180 relative to the attachment of the rails 180 to the cross beams 52, 54 of the carrier 10, as shown in FIG. 10. All possible derivations known to those having ordinary skill in the art with the present disclosure before them are likewise contemplated for use.

Figure 11:
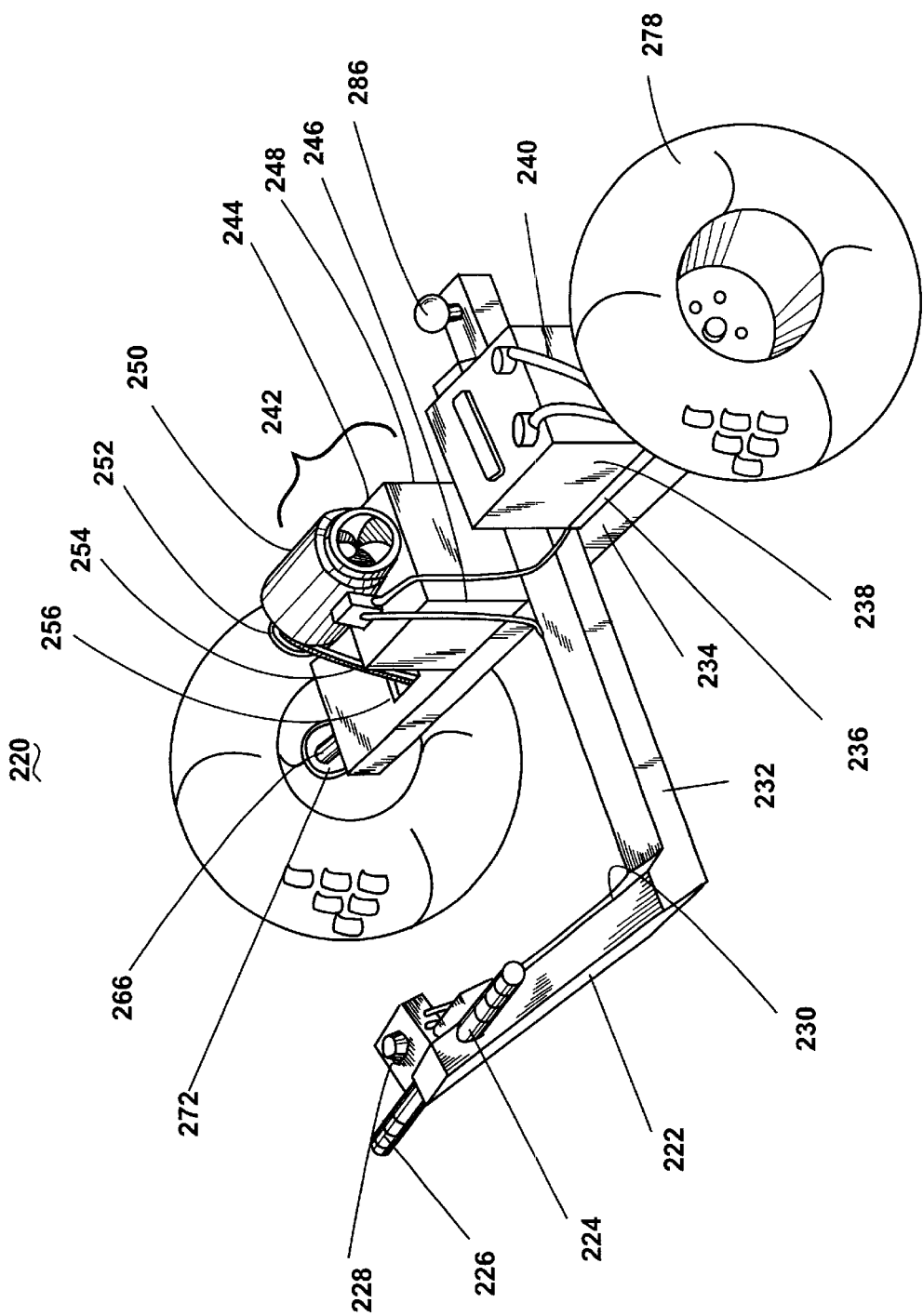
FIG. 11 is a perspective view of a motorized pull assist according to the invention.

Additionally, it is envisioned that a motorized pull assist 220, depicted in FIG. 11, would be useful in combination with the previous embodiments when a personal watercraft is too heavy for manual propulsion or in places where a conventional vehicle could not travel. The motorized pull assist 220 comprises a handle support 222 connected to the forward end of a center beam 232 at an obtuse angle. A pull handle 224 is welded or bolted to the handle support 222. Grips 226 are secured to the ends of the pull handle 224. A throttle control 228 being a rheostat or switch can be affixed to the handle support 222 with a control cable 230 connecting the throttle control 228 to a power source 238 and a motor 250.

The center beam 232 extends rearwardly from the handle support 222. A crossbeam 234 is affixed perpendicular to and beneath the center beam 232. The cross beam 234 is constructed of U-shaped galvanized steel or aluminum channel, open side down, having a span greater than its height. An axle 266 is carried within the channel of the crossbeam 234, extending beyond the ends thereof and rotatably connected thereto. Hubs 272 are affixed to each end of the axle 266, and wheels 278 are mounted thereon.

A battery carrier 236 is affixed to the crossbeam 234 to one side of the center beam 232 and holds a battery 238. A set of power leads 240 carry electricity from the battery to a motor 250 mounted on the cross beam 234 to the other side of the center beam 232. The motor 250 is mounted on a motor mount bracket 242 consisting of a motor mount bracket top plate 244, a motor mount bracket front plate 246, and a motor mount bracket rear plate 248. The bracket 242 disposes the motor 250 at the correct height to assemble a linkage for transferring power from the motor 250 to wheel 278 of the motorized pull assist 220 to move an attached personal watercraft carrier. The linkage comprises a drive sprocket or pulley 252 operably joined to the motor 250, a chain or belt 254 that passes through a slot 256 in the cross beam 234, a tensioner (not shown), and an axle sprocket or pulley (not shown).

The axle sprocket or pulley is affixed to the axle 266 within the channel of the crossbeam 234, in any known manner to transfer rotation of the axle sprocket to the axle 266. The axle 266 extends the length of the crossbeam 234 and has axle bearings (not shown) which allow free rotation of the axle as it passes through the ends of the crossbeam 234. The ends are fitted with a bearing race (not shown) on each end to locate and support the weight of the pull assist 220 on the axle 266. At the ends of the axle 266 are affixed wheel hubs 272 that have lugs (not shown) for attaching wheels 278 bearing conventional low-pressure balloon tires, or a single pair of open-sided, large-surface wheels 70, 100, 112 as described in any of the previous embodiments. The wheels 278 are held in place by lug nuts or other fasteners.

The aft end of the center beam 232 extends beyond the wheels 278. A hitch ball 286, or other suitable attachment mechanism for linking to a personal watercraft carrier, is mounted to the aft end of the center beam 232.

While particular embodiments of the invention have been shown, it will be understood, of course, that the invention is not limited thereto since modifications may be made by those skilled in the art, particularly in light of the foregoing teachings. Reasonable variation and modifications are possible within the scope of the foregoing disclosure of the invention without departing from the spirit of the invention.

What is claimed is:

1. A personal watercraft carrier having a carrier frame, the carrier frame having rail supports for watercraft, a tongue for pushing or pulling the carrier, and one or more axles mounting wheels for rolling movement of the carrier frame over a surface, the improvement wherein the wheels have an outer rolling surface wherein the ratio of the width to the diameter of the wheels outer rolling surface is greater than 0.6 so that the carrier with a watercraft mounted thereon is easily rolled over soft surfaces such as sand for depositing the watercraft in the water, the wheels being constructed so the carrier as a whole has neutral or negative buoyancy, whereby when the carrier with watercraft is rolled into the water for launching the watercraft, the carrier drops away from the watercraft as the depth of the water increases, and the carrier can be rolled into the water to be positioned under the watercraft for removing the watercraft from the water.

2. The personal watercraft carrier according to claim 1, wherein the wheels are constructed of plastic.

3. The personal watercraft carrier according to claim 2, wherein the outer surface is formed by a cylindrical rim and the wheels further include a hub and a plurality of spokes extending radially inwardly from the cylindrical rim to the hub.

4. The personal watercraft carrier according to claim 2, wherein the outer surface is formed by a cylindrical rim and the wheels further include a hub and a disk extending radially inwardly from the cylindrical surface to the hub.

5. The personal watercraft carrier according to claim 1, wherein the wheels are constructed of metal.

6. The personal watercraft carrier according to claim 5, wherein the outer surface is formed by a cylindrical rim and the wheels further include a hub and a plurality of spokes extending radially inwardly from the cylindrical rim to the hub.

7. The personal watercraft carrier according to claim 5, wherein the outer surface is formed by a cylindrical rim and the wheels further include a hub and a disk extending radially inwardly from the cylindrical surface to the hub.

8. The personal watercraft carrier according to claim 1, wherein the outer surface is formed by a cylindrical rim and the wheels further include a hub and a plurality of spokes extending radially inwardly from the cylindrical rim to the hub.

9. The personal watercraft carrier according to claim 1, wherein the outer surface is formed by a cylindrical rim and the wheels further include a hub and a disk extending radially inwardly from the cylindrical surface to the hub.

10. The personal watercraft carrier according to claim 1, wherein the wheels are open so that water freely flows into them.

11. The personal watercraft carrier according to claim 1, wherein the carrier is no longer than six feet.

12. The personal watercraft carrier according to claim 1, wherein the carrier has neutral buoyancy.

13. The personal watercraft carrier according to claim 1, wherein the outer surface is a right-cylindrical surface.

14. The personal watercraft carrier according to claim 1, wherein the ratio of width to diameter of the wheels is one.

* * * * *